United States Patent [19]

Rasmusson

[11] Patent Number: 4,662,178
[45] Date of Patent: May 5, 1987

[54] SELF CONTAINED ROTATOR APPARATUS

[76] Inventor: James K. Rasmusson, 14736½ S. Pulaski, Midlothian, Ill. 60445

[21] Appl. No.: 539,775

[22] Filed: Oct. 7, 1983

Related U.S. Application Data

[63] Continuation-in-part of Ser. No. 343,872, Jan. 29, 1982, abandoned.

[51] Int. Cl.[4] ............................................. B64G 1/38
[52] U.S. Cl. ........................................ 60/721; 244/165
[58] Field of Search ........................... 244/165; 60/721

[56] References Cited

U.S. PATENT DOCUMENTS

| | | | |
|---|---|---|---|
| 3,424,401 | 1/1969 | Maurer | 244/165 |
| 3,452,948 | 7/1969 | Kukel et al. | 244/165 |
| 3,998,409 | 12/1976 | Pistiner | 244/165 |
| 4,230,294 | 10/1980 | Pistiner | 244/165 |

Primary Examiner—Allen M. Ostrager
Attorney, Agent, or Firm—Frank J. Uxa

[57] ABSTRACT

A rotator apparatus comprising at least one channel capable of containing a flowable material and capable of assuming a first configuration and a second configuration at least one pump capable of causing the flowable material to flow in the channel; and a configuration change motor capable of moving the channel between the first configuration and the second configuration. An acceleration mode and a deceleration mode are described useful to control the direction and/or speed of rotation of the present apparatus. A further rotator apparatus is disclosed and comprises a plurality of motor/flywheel assemblies arranged so as to have at least one and preferably two assemblies per each of the three axes of rotation. This apparatus also has an acceleration mode useful to control the direction of rotation of the present apparatus.

15 Claims, 11 Drawing Figures

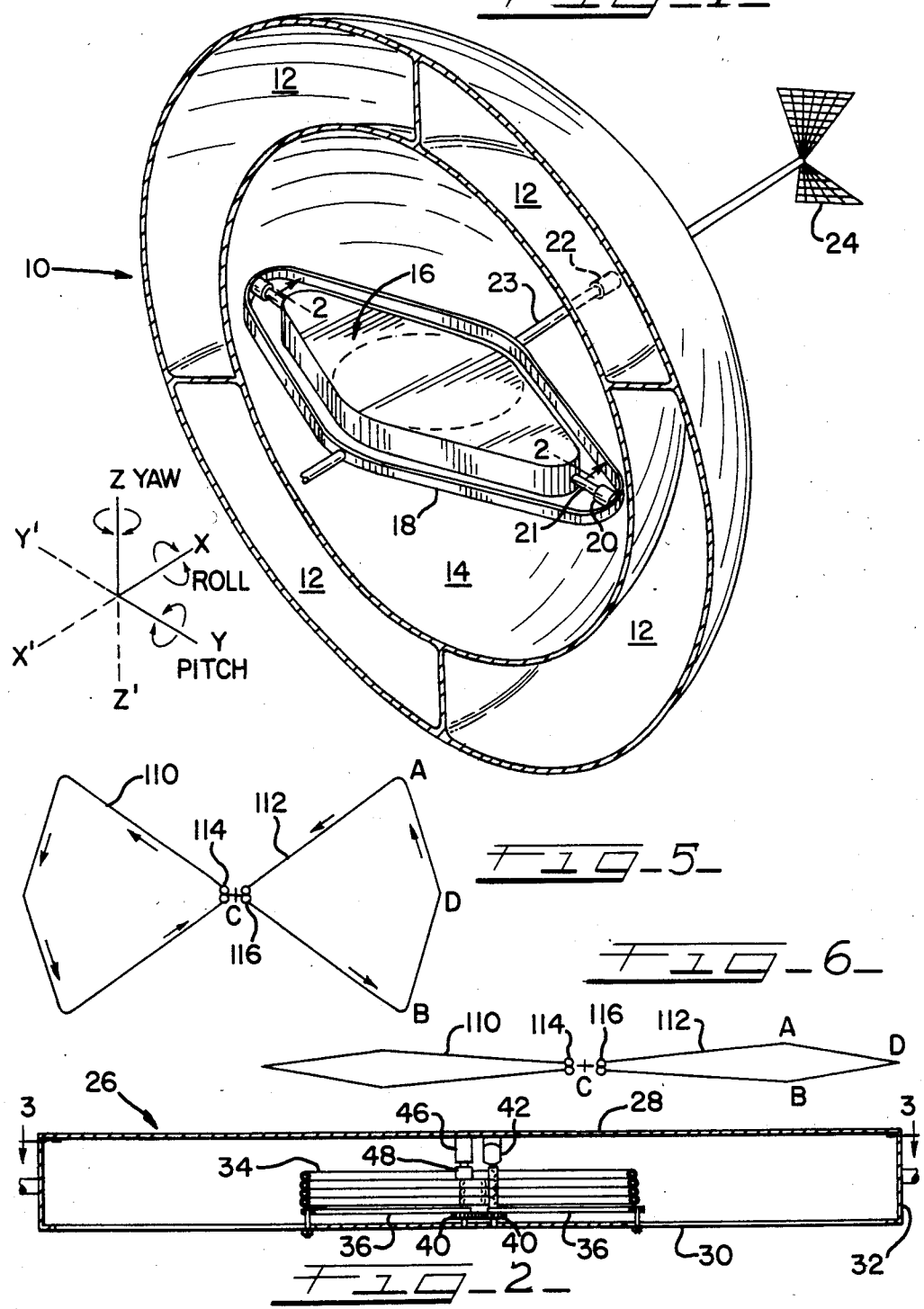

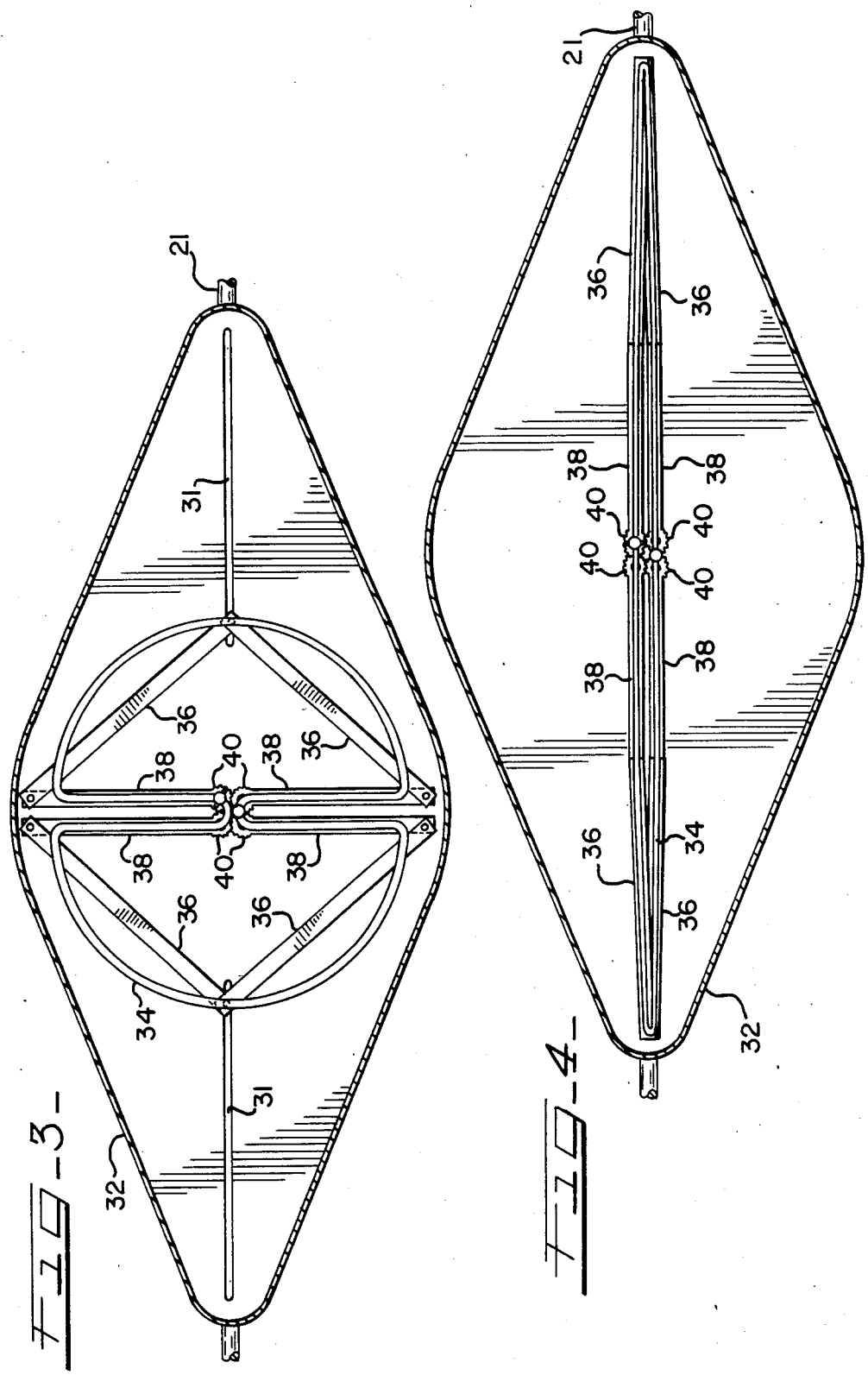

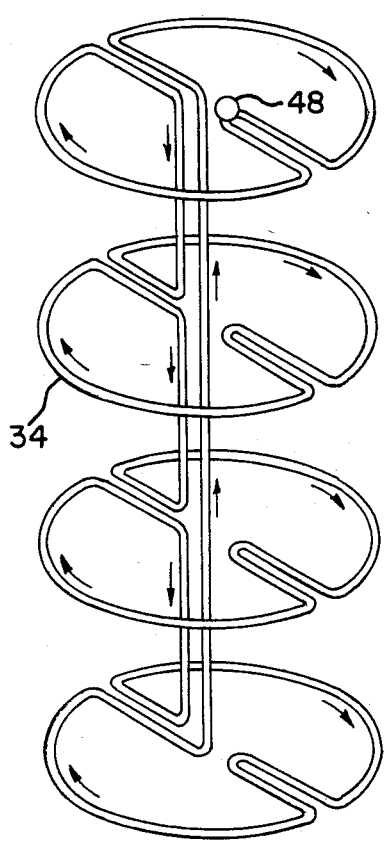
FIG_7_
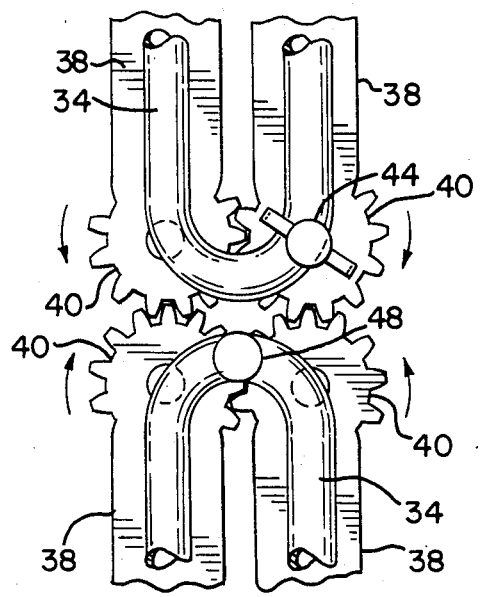
FIG_8_
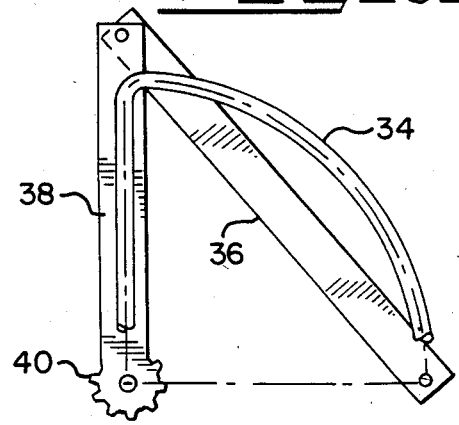
FIG_9_
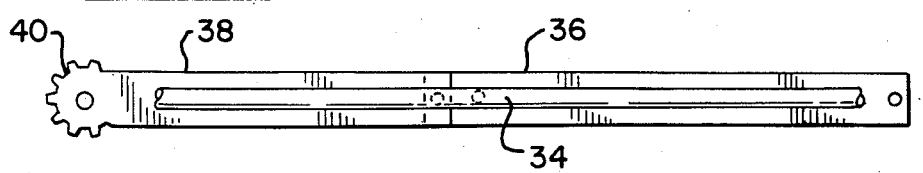
FIG_10_

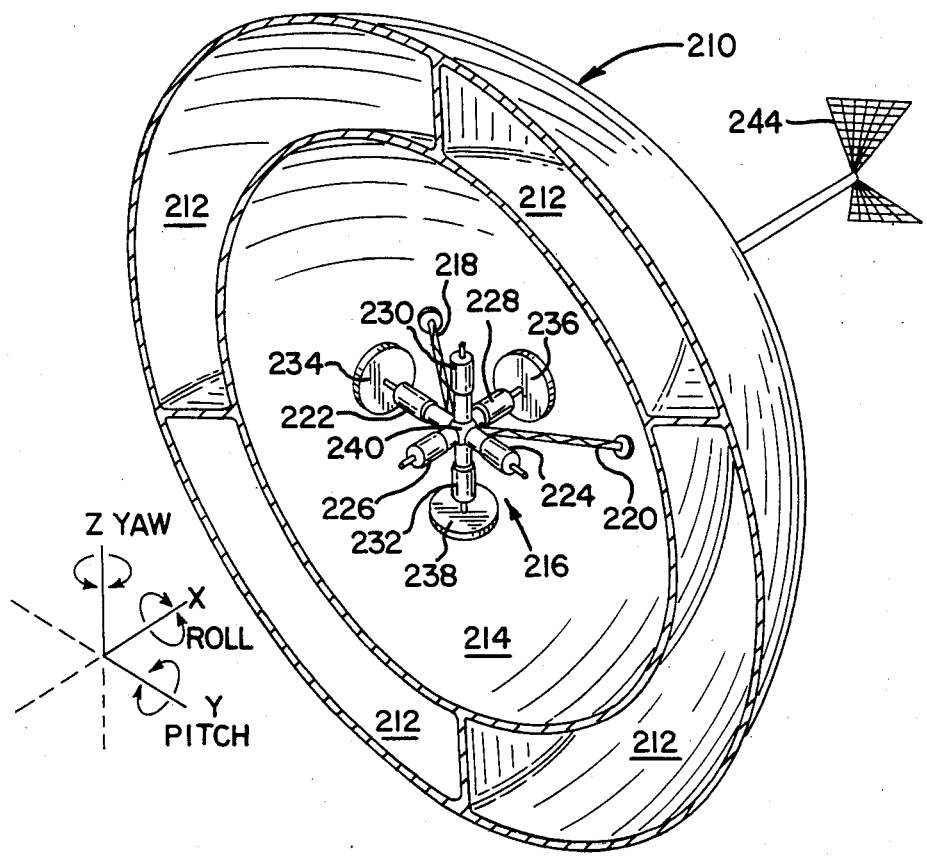

causes the channel means to move between the first configuration and the second configuration.

In another preferred embodiment, the present system further comprises attitude adjustment means associated with the channel means. Such attitude adjustment means are capable of being activated to adjust the attitude of rotation of the apparatus. For example, such attitude adjustment may comprise one or more additional motors to adjust the attitude or orientation of the channel means, as desired. This feature greatly enhances the flexibility of the present system. Thus, with the attitude adjustment means in place, only one of the present rotator apparatus is needed to, for example, stabilize the roll, pitch, and yaw of space satellites.

The present system preferably includes a housing which acts to substantially enclose the channel means, thus, for example, preventing damage to the flexible tubing of the channel means.

Any suitable flowable material may be used in the present system. The term "flowable material" as used herein refers to a material that may be caused to flow in the present channel means under the influence of the present pump means. Preferably, the flowable material is substantially uniform. The flowable material is preferably a fluid, more preferably a liquid, at the conditions of use. The rotator apparatus is attached to the spacecraft, or to any other structure which is to undergo a self contained rotation, by a rotatable shaft such that any rotation which the rotator apparatus produces will be transmitted to main structure, as a counter rotation.

The operation of the present apparatus in the acceleration mode and the deceleration mode is another indication of the flexibility of this system. The apparatus operates in each of these modes as follows. In this description, the first configuration of the channel means includes at least one arc of a circle and the second configuration of the channel means is substantially completely flat. These first and second configurations are illustrated in FIGS. 3 and 4, respectively.

The acceleration mode sequence begins with the whole system at rest and the channel means in the first configuration. The pump means is activated to accelerate the flowable material (e.g., liquid) in the channel means in the counter-clockwise (ccw) direction. Upon acceleration of the liquid, in the ccw direction, the spacecraft (or other structure) accelerates in the clockwise (cw) direction. After acceleration of the liquid is complete the liquid keeps moving at a constant velocity until the spacecraft has achieved the desired attitudinal change, then the channel means is moved to the second configuration. During this transition, the spacecraft stops and remains at the desired attitude. Upon achieving the second configuration the liquid is decelerated to zero velocity. This deceleration does not change the attitude of the spacecraft or other structure in that the second configuration has virtually no tangential force componentry. At the same time, the present apparatus continues to rest at the desired attitude as above. With the liquid remaining at zero velocity, the channel means is moved to the first configuration. This results in substantially no change of attitude to the system since the liquid is at zero velocity. The sequence is repeated as desired.

The deceleration mode sequence starts with the whole system at rest and the channel means in the second configuration. The liquid is accelerated to a constant speed in the ccw direction. This acceleration provides substantially no rotation applied to the present apparatus since the channel means is in the "flattened" second configuration and has virtually no tangential force componentry. With the liquid at constant speed, the channel means is moved to the first configuration. During this transition the spacecraft is accelerated in the cw direction to a given rotational velocity. When the channel means reaches the first configuration, the liquid is decelerated to zero velocity by stopping the pump means when the spacecraft has rotated to desired attitude. This deceleration causes the present apparatus to stop at the desired attitude and rotate in the ccw direction. With the liquid at zero velocity, the channel means is moved to the second configuration. Substantially no rotation is caused by this movement and the present apparatus continues to remain at the desired attitude. As before, the sequence can be repeated as desired.

In another embodiment according to the present invention, an improved rotator apparatus is provided. In this embodiment, the rotator apparatus comprises a plurality of flywheels (or flywheel means) in spaced relation so that at least one flywheel acts, and preferably two flywheels act, in each axis of rotation of the apparatus; and a corresponding plurality of motor means, each acting to provide rotation of a different one of the flywheels. In order to maximize the control of rotation, it is preferred that each of the flywheels acting in the same axis of rotation of the apparatus rotate in the same direction at substantially the same speed.

The alternative flywheel/motor means apparatus preferably has two flywheel/motor means assemblies per each of the three axes of rotation, that is each pair of flywheel/motor means assemblies is responsible for attitudinal adjustment along one axis of rotation, pitch, roll and yaw. Each pair of flywheel/motor means assemblies is preferably synchronized so as to have the flywheels always rotating in the same direction at substantially the same speed. These assemblies are connected to each other by inner supports, and are connected to the central compartment of the spacecraft (or other structure to be rotated) by outer supports such that any rotational acceleration which the flywheel achieves will be transmitted to the spacecraft as a counter rotation.

The operation of this alternative flywheel/motor means apparatus is in an acceleration mode. The acceleration mode sequence begins with the entire system at rest. Then, depending on what attitudinal change is desired, one pair of motors is activated so as to accelerate their attached flywheels. Upon acceleration of the flywheels, say in the ccw direction, the spacecraft also accelerates but in the cw direction to a given rotational velocity. Angular momentum is conserved; $M_f V_f R_f = M_s V_s R_s$, where "f" is flywheel and "s" is spacecraft including the motor. A realistic example would be for a relatively lightweight flywheel to accelerate to a high rotational speed with the much heavier spacecraft counter-rotating to a small rotational velocity.

After acceleration of the flywheel is completed, the flywheel is made to keep rotating at a constant velocity until the spacecraft has achieved the desired attitudinal change. Then, the pairs of motors are deactivated (stopped) and their attached flywheels are decelerated to zero rotational velocity, causing the spacecraft to stop at the desired attitude. The sequence can be repeated as desired with any of the pairs of flywheel/mo-

4,662,178

SELF CONTAINED ROTATOR APPARATUS

BACKGROUND AND SUMMARY OF THE INVENTION

Related Applications

This application is a continuation-in-part application of a co-pending application Ser. No. 06/343,872 filed on Jan. 29, 1982 now abandoned.

The present invention relates to rotator apparatus. More particularly, the present invention relates to rotator apparatus useful, for example, in space applications and which are substantially self contained.

Space satellites are often stabilized or re-oriented, e.g., pitch, yaw and roll, by means of retro rockets placed on the periphery of the satellites. Like all rockets, such retro rockets expel a propellant mass which is carried on board as part of the original payload mass. With a conventional retro system, the propellant is non-retrievable so that when the supply of propellant is exhausted, the retro rockets become inoperable and unable to stabilize the satellite. Rockets also have often been suggested as means for providing the desired rotational acceleration for space stations. Again, such rockets are useful only as long as a supply of propellant is provided. Clearly, it would be desirable to provide a stabilizer for space satellites and/or a rotational accelerator for space stations which does not require exhaustable rocket propellant.

Therefore, one object of the present invention is to provide an improved rotator apparatus.

Another object of the present invention is to provide a improved rotator apparatus which is substantially self-contained.

A further object of the present invention is to provide an improved rotator apparatus to change the attitude or rotation of which can be adjusted as desired.

An additional object of the present invention is to provide an improved stabilization or re-orientation system for space satellites.

Other objects and advantages of the present invention will become apparent hereinafter.

An improved rotator apparatus has now been discovered. In one embodiment, this apparatus comprises at least one channel means capable of containing flowable material and capable of assuming a first configuration and a second configuration; at least one pump means associated with the channel means and being capable of causing the flowable material to flow, e.g., at accelerating and decelerating flowrates, in the channel means; and motive means associated with the channel means and being capable of moving the channel means between the first configuration and second configuration.

Rotation of the present apparatus can be obtained, as desired, by co-ordinating the action of the pump means and the motive means to cause flowable material to flow at accelerating and/or decelerating flowrates in a suitably configured channel means. An acceleration mode of rotation and a deceleration mode of rotation for the present apparatus will be described hereinafter.

The present system is seen to provide substantial benefits, e.g., relative to retro rockets presently in use to provide rotational stability and/or acceleration. The rotator apparatus of the present invention requires no propellant, the supply of which can be exhausted. This system can function as long as there is energy, and energy can be stored in very concentrated forms such as fuel cells and nuclear energy or it can be collected indefinitely from solar energy devices. The present system is also relatively simple, easy to assemble and maintain, is easily controlled and provides reliable rotation, as desired.

The channel means and pump means preferably are structured to provide a continuous, i.e., closed, path within which the flowable material can flow. Thus, the same flowable material is preferably used over and over again. In order to improve the size, efficiency and power utilization of the present rotator, in one embodiment the channel means is preferably arranged in a stacked array of loops. Preferably, the loops are structured so that the general direction of flow of the flowable material in each of the loops is the same relative to the direction of stacking.

An alternate embodiment of the present system involves a first and second channel means and a first and second pump means associated with the first and second channel means respectively. Preferably, the first and second channel means are substantially co-planar (i.e., exist in substantially the same plane), are located so that the center of mass of the system to be rotated, e.g., the spacecraft, is substantially directly between the two channel means; the general direction of flow of flowable material in each is the same; and the apparatus is structured so that the two channel means move between the first and second configurations substantially in unison. More preferably, the first and second channel means are structurally substantially identical.

The channel means, whether one, two or more, is preferably of substantially uniform cross sectional area and is preferably constructed of flexible material, e.g., tubing, and is constructed to allow efficient movement between the first configuration and the second configuration. The channel means may be "flexibly biased" to aid in returning to and maintaining the proper or desired configuration. For example, the channel means may be structured to urge the channel means, when desired, to form outwardly extending arcs rather than inward or concave arcs.

As noted above, the channel means may assume a first configuration and a second configuration. Preferably, the first configuration is a rounded configuration and the second configuration is a flattened configuration. In a more preferred embodiment, the first configuration is such that the channel means forms one or more arcs of a circle; and the second configuration is such that there is substantially no tangential force around the center of rotation caused by the flowable material flowing in the channel means when such means is in the second configuration.

Both the pump means and the motive means can be conventionally powered, e.g., using any suitable power source. Preferably, these components are electrically powered.

In one preferred embodiment, the motive means includes a plurality of members associated with the channel means, the structure of each of the members being adjustable between two ultimate configurations. A gearing system associated with the members is provided and is structured to act so that each member has the same structure(i.e., configuration) at any time. A motor means is associated with at least one of the members and acts to adjust the structure (configuration) of the members, as desired. The association of the channel means and the members is such that adjusting the structure of the members between two ultimate configurations tor means assemblies going through the requisite sequence.

The sequence can also be repeated with the flywheels spinning in the cw direction. This would cause the spacecraft to spin in the ccw direction. This would be done if the desired attitudinal change could be achieved more quickly by having the motors spinning in this direction.

In the above descriptions of the various modes of operation, it was indicated that the present apparatus was rotated. Of course, other pieces of equipment, e.g., space satellites and space stations associated with the present rotator apparatus would also rotate with the present rotator. These pieces of equipment are preferably arranged so that their center of mass corresponds with the center of mass of rotator.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a front side perspective view, partly in cross section, of a space satellite employing an embodiment of an apparatus according to the present invention.

FIG. 2 is a cross sectional view taken along line 2—2 in FIG. 1.

FIG. 3 is a cross sectional view taken along line 3—3 of FIG. 2

FIG. 4 is a cross sectional view of the system shown in FIG. 2 except that the flexible tubing is in the flattened configuration.

FIG. 5 is a schematic illustration showing a partial alternative embodiment of an apparatus according to the present invention.

FIG. 6 is a schematic illustration of the embodiment shown in FIG. 5 in a flattened configuration.

FIG. 7 is an enlarged view, in perspective, of the flexible tubing array used in the embodiment of the present invention illustrated in FIG. 1, and more specifically FIG. 3.

FIG. 8 is a top plan view of the gearing arrangement used in the embodiment of the present invention illustrated in FIG. 1.

FIG. 9 is an isolated, top plan view of one portion of the flexible tubing configured as in FIG. 3.

FIG. 10 is an isolated, top pian view of one portion of the flexible tubing configured as in FIG. 4.

FIG. 11 is a front side perspective view, partly in cross section, of a spacecraft employing the flywheel/motor means embodiment of the apparatus according to the present invention.

DESCRIPTION OF THE PREFERRED EMBODIMENT

Referring to FIG. 1, a space satellite 10 is shown traveling through outer space. Space satellite 10 includes a series of outer compartments 12 (which are undersized in FIG. 1 for purposes of clarity in illustrating the embodiment of the present invention) in which various equipment used in operating space satellite 10 is located; and a central compartment 14. A self contained rotator (S C R), shown generally at 16 is supported within central compartment 14 by a gimbol ring 18 and the shafts of flip-over/roll motor 20 and pitch/yaw motor 22. The S C R is attached to spacecraft by shaft 23. Solar collector 24 is placed outside space satellite 10 and acts to collect energy from the sun to enable space satellite 10 to operate.

FIGS. 2, 3 and 4 show certain of the details of S C R 16. Rotator housing, shown generally at 26, includes top plate 28, bottom plate 30 and side wall 32 and acts to house components of S C R 16. Within rotator housing 26 is a stacked array of flexible tubing 34 attached to support members 36. Each support member 36 is secured to bottom plate 30, is slideably moveable in track 31 of bottom plate 30, and is pivotally secured to a different gear arm 38 each of which terminate in a gear head 40. Gear heads 40 mesh together as shown in FIG. 8 to allow movement of the support members 36, gear arms 38 and flexible tubing 34 between the first configuration, shown in FIG. 3, and the second configuration, shown in FIG. 4. FIG. 9 shows an individual segment of flexible tubing 34 and one support member 36 and gear arm 38 in the first configuration; whereas FIG. 10 shows these same components in the second configuration. The movement between first and second configuration is caused, as desired, by activating configuration change motor 42 which is secured to top plate 28. The shaft 44 of configuration change motor 42 is secured directly to only one gear head 40. However, the gearing arrangement shown in FIG. 8 transmits the power from configuration change motor 42 to move between first and second configurations as described above.

The first configuration shown at least partially in FIGS. 2, 3, 7 and 9, involves flexible tubing 34 being configured to form circular arcs. On the other hand, the second configuration, shown at least partially in FIGS. 4 and 10, involves flexible tubing 34 being in a substantially flat configuration.

Flexible tubing 34 is hollow and has a substantially uniform hollow cross section. Pump motor 46 is secured to top plate 28. Pump motor 46 is associated with pump 48 which intersects flexible tubing 34. Activating pump motor 46 and pump 48 causes liquid, e.g., water or other suitable material which is liquid at the conditions existing inside rotator compartment 14, in flexible tubing 34 to move in the direction as shown in FIG. 7.

FIGS. 5 and 6 schematically illustrate a portion of one alternate embodiment of the present rotator apparatus. In this embodiment, two substantially co-planar loops of flexible tubing 110 and 112 are arrayed around the center of the mass of the apparatus. Two pumps 114 and 116 can be activated to move iiquid in hollow flexible tubing loops 110 and 112, respectively, in the direction shown in FIG. 5. Means, not shown, are provided to move loops 110 and 112 between the first configuration, shown in FIG. 5, and the second configuration shown in FIG. 6, as desired.

The embodiment shown in FIGS. 5 and 6 is not believed to be as advantageous as the embodiment identified generally as 16. For example, this alternate embodiment involves two pumps. Also, note that the loops 110 and 112 form chord legs (e.g., A D and B D) whereas tubing 34 in FIG. 3 forms arc legs. It has been found that arc legs are more efficient in transmitting rotational forces produced by liquid accelerating (or decelerating) in the tubing to the space satellite 10.

Referring again to the basic design of S C R 16, flexible tubing 34 is in a stacked array of loops. This array is desirable to allow improved utiiization of pump 48. The hollow diameter and length of flexible tubing 34, and the size of pump 48 and pump motor 46 are among the factors which must be considered, and possibly varied, in using the present system to provide desired and controlled rotational stability to space satellite 10.

Flexible tubing 34 is "flex-biased" so that when flexible tubing 34 moves from the second configuration to the first configuration the arc legs of the flexible tubing will bend away from the center, thus providing a proper first configuration.

Flip-over/roll motor 20 and shaft 21 are responsible for orienting S C R 16 to provide rotational stability of space satellite 10 in the roll mode. Flip-over/roll motor 20 may also be needed to make adjustment in yaw mode.

An adjustment in the roll mode is accomplished by orienting S C R 16 so that top plate 28 is in the Y-Z plane (see FIG. 1). Such reorientation is accomplished by selectively activating flip-over/roll motor 20 and must be accomplished with flexible tubing 34 in the second configuration to disallow precessive forces to nullify or complicate desired attitudinal changes of spacecraft.

Adjustment in the yaw mode is made by having S C R 16 oriented so that top plate 28 is in the X-Y plane as shown in FIG. 1. With the S C R in this orientation, the S C R goes through sequence as needed to achieve the desired rotational stability in the yaw mode. This reorientation is accomplished by selectively activating either or both motors 20 and 22, depending on what orientation S C R was in prior to the need for the yaw mode adjustment.

Adjustments in the pitch mode (see FIG. 1) is made by reorienting S C R 16 so that top plate 28 is in the X-Z plane. This orientation is achieved by selectively activating pitch motor 22 and shaft 23. Orientation of S C R 16 into X-Z plane could also involve activating motor 20 depending on what orientation S C R was in prior to the need for the pitch mode adjustment. Once S C R 16 is properly oriented S C R 16 goes through sequence as needed to achieve the desired rotational stability in the pitch mode. Thus, S C R 16 can provide complete rotational stability (in the roll, pitch and yaw modes) to space satellite 10.

Each rotation of S C R 16 into a desired plane of orientation, e.g., for a retro adjustment, should be noted, say by a computer on board space satellite 10. Each time S C R 16 is reoriented into the same plane, the direction of rotation into the plane should be reversed. If this reversal is not done, a movement would be applied to space satellite 10 in the same direction with each repetition of the orientation.

Referring to FIG. 11, a spacecraft 210 is shown traveling through outer space. Spacecraft 210 includes a series of outer compartments 212 (which are undersized in FIG. 11 for purposes of clarity in illustrating this embodiment of the present invention) in which various equipment used in operating spacecraft 210 is located; and a central compartment 214. A flywheel/motor rotator (FMR), shown generally at 216, is supported within central compartment 214 by outer supports 218 and 220. Solar energy from a solar collector 244 is provided for the operation of FMR 216 by connections within the outer supports 218 and 220.

FMR 216 itself includes three pairs of electric motors 222 and 224; 226 and 228; and 230 and 232, with each pair located on a different axis of rotation of FMR 216. Each electric motor operates a different flywheel. For example, motors 222, 228 and 232 operate flywheels 234, 236 and 238, respectively. (For the sake of clarity the flywheels associated with motors 224, 226 and 230 are not shown). The various flywheel/motor assemblies are connected together by inner support 240.

The operation of each pair of motors is synchronized to provide rotation of the corresponding set of flywheels in the same direction at the same speed.

The FMR 216 functions as follows. A pitch adjustment to spacecraft 210, is achieved by activating motors 222 and 224 to cause rotation of the corresponding pair of flywheels. After the desired pitch adjustment has been accomplished, motors 222 and 224 are deactivated. Similarly, a roll adjustment is achieved by activating/deactivating motors 226 and 228, as desired; and a yaw adjustment is achieved by activating/deactivating motors 230 and 232, as desired.

While this invention has been described with respect to various specific examples and embodiments, it is to be understood that the invention is not limited thereto and that it can be variousiy practiced within the scope of the following claims.

I claim:

1. A rotator apparatus contained within a craft capable of rotating associated structure about at least one axis comprising: a rotator system comprising at least one channel means capable of containing a flowable material and capable of assuming a first configuration and a second configuration, at least one pump means associated with said channel and being capable of causing said flowable material to flow in said channel means, and motive mens associated with said channel means and being capable of moving said channel means between said first configuration and said second configuration; and means associated with both said structure and said rotator system and being capable of transmitting the rotational forces developed in said rotator system to said structure to cause said structure to rotate.

2. The apparatus of claim 1 wherein said channel means and said pump means provide a continuous path within which said flowable material can flow.

3. The apparatus of claim 2 wherein said channel means includes a stacked array of loops.

4. The apparatus of claim 3 wherein said loops are structured so that the general direction of flow of said flowable material in each of said loops is the same relative to the direction of stacking.

5. The apparatus of claim 1 wherein said first configuration of said channel means is a rounded configuration and said second configuration of said channel mean is a flattened configuration.

6. The apparatus of claim 1 wherein said motive means includes a gearing system to aid in moving said channel means between said first configuration and said second configuration.

7. The apparatus of claim 1 wherein said motive means includes at least one member associated with said channel means, the structure of said member being adjustable between two configurations whereby adjusting said structure causes said channel means to move between said first configuration and said second configuration.

8. The apparatus of claim 1 wherein said motive means comprises a plurality of members associated with said channel means, the structure of each of said members being adjustable between two configurations; a gearing system associated with said members and structured to act so that each of said members has substantially the same structure at any given time; and motor means associated with at least one of said members and acting to adjust the structure of said members, as desired, whereby adjusting said structure causes said channel means to move between said first configuration and said second configuration.

9. The apparatus of claim 1 which comprises a first and second channel means and a first and second pump means associated with said first and second channel means, respectively.

10. The apparatus of claim 9 wherein said first and second channel means are substantially co-planar, are located so that the center of mass of said apparatus is substantially, directly between said first and second channel means, the general direction of flow of flowable material in each of said first and second channel means is the same, and said apparatus is structured so that said first and second channel means move between said first configuration and said second configuration substantially in unison.

11. The apparatus of claim 1 which further comprises attitude adjustment means associated with said channel mean and being capable of being activated to adjust the attitude of rotation of said apparatus.

12. The apparatus of claim 1 wherein said flowable material is a fluid.

13. The apparatus of claim 1 wherein said flowable material is a liquid.

14. The apparatus of claim 1 which further comprises housing means acting to substantially enclose said channel means.

15. The apparatus of claim 1 wherein said channel means is biasly structured to aid in returning said channel means to said first configuration from said second configuration.

* * * * *